United States Patent [19]

D'Ull et al.

[11] Patent Number: 5,232,263
[45] Date of Patent: Aug. 3, 1993

[54] PROTECTIVE AIRCRAFT CARRIER FOR BABY OR SMALL CHILD

[76] Inventors: Walter D'Ull, 330 E. 38 St., Apt. 45I, New York, N.Y. 10016; Bennett A. Meyer, 70 Valley Rd., Glen Rock, N.J. 07452

[21] Appl. No.: 743,784

[22] Filed: Aug. 9, 1991

[51] Int. Cl.[5] .............................................. B60N 2/26
[52] U.S. Cl. .................................. 297/216; 297/464; 297/184
[58] Field of Search ............... 297/464, 465, 216, 487, 297/184, 250

[56] References Cited

U.S. PATENT DOCUMENTS

| | | | |
|---|---|---|---|
| 3,713,695 | 1/1973 | Von Wimmersperg | 297/487 X |
| 4,033,622 | 7/1977 | Boudreau | 297/250 |
| 4,139,131 | 2/1979 | Hathaway | 224/6 |
| 4,149,687 | 4/1979 | Nunemacher | 224/159 |
| 4,314,727 | 2/1982 | Potts | 297/184 |
| 4,333,591 | 6/1982 | Case | 224/160 |
| 4,366,587 | 1/1983 | Takada | 297/216 X |
| 4,492,326 | 1/1985 | Storm | 224/160 |
| 4,674,800 | 6/1987 | Ensign | 297/464 X |
| 4,738,489 | 4/1988 | Wise et al. | 297/487 |
| 4,790,593 | 12/1988 | Dovalas et al. | 297/216 X |
| 4,834,322 | 5/1989 | Wurst | 244/122 AG |
| 4,923,104 | 5/1990 | Rice et al. | 224/155 |
| 5,002,338 | 3/1991 | Gisser | 297/464 X |

*Primary Examiner*—Peter R. Brown

[57] ABSTRACT

A protective carrier for a baby, infant or small child is disclosed having a pouch, sack or bag, made of fabric, soft plastic or leather, in conjunction with other soft cushioning material, and is installed in a rearwards-facing orientation onto an aircraft bulkhead. A shoulder strap harness is provided to restrain the baby or infant during takeoff and landing and in the event of violent aircraft motion during turbulence, crash or accident. The fabric carrier is provided with a clear protective cover, which is placed over the carrier device. The cover is constructed of a clear or translucent plastic material that is resistant to impact. The cover is fabricated with a number of holes or apertures, to allow free circulation of air. The complete assembly is attached to the aircraft bulkhead.

10 Claims, 5 Drawing Sheets

PROTECTIVE AIRCRAFT CARRIER FOR BABY OR SMALL CHILD

BACKGROUND OF THE INVENTION

The present invention relates generally to those devices that are intended for receiving and protecting a baby, infant, or small child. More specifically, the present invention relates to a device intended for carrying and protecting a baby, infant, or small child during transit in an aircraft or other vehicle.

When infant children are carried as passengers on an aircraft, they are often carried in their parent's lap, or are placed in an individual aircraft seat, or are placed in a carrier device which is strapped onto an aircraft seat, or held to the floor by an adult. These methods provide virtually no protection in the event of an aircraft crash or other mishap, such as clear air turbulence.

When a baby or small child is carried on an aircraft in this manner, the child is placed at great risk of serious personal injury in the event of several types of accidents. Many of these injuries could be avoided by providing a greater level of protection. A parent or other adult is not able to adequately restrain a baby or small child when high accelerations are experienced. Such high accelerations are experienced during a crash, or during other mishaps.

It is likewise hazardous to transport a baby, infant, or small child on an aircraft seat, either with or without a protective carrier. Adequate protection for such a baby, infant, or small child is not afforded by use of an aircraft seat, since aircraft seats are designed for the physiognomy of adults. Further, the safety of a conventional aircraft seat is limited due to its orientation in a forward facing direction. The use of an aircraft seat for a baby, infant, or small child also has the disadvantage of occupancy of an additional seat. An inadequate level of protection is provided when a protective carrier is placed onto a regular aircraft seat, since the carrier must be fastened to the seat by means of the usual aircraft seat belt, which is not designed for this purpose.

Various devices ar known to the art for the transportation of infants and small children either in automobiles, or borne one the body of an adult. A device that is typical of those for protection of infants in automobiles is disclosed in U.S. Pat. No. 4,033,622 issued on Jul. 5, 1977 to Robert J. Boudreau. Another device of this general type is disclosed in U.S. Pat. No. 4,738,489 issued on Apr. 19, 1988 to Robert D. Wise et al. However, both the Boudreau car seat and the Wise car seat are not disclosed for use in an aircraft.

A child carrier that is worn on the body of an adult is disclosed in U.S. Pat. No. 4,139,131 issued on Feb. 13, 1979 to Sandra J. Hathaway. Another device, also intended for carrying a baby on the body of an adult, is disclosed in U.S. Pat. No. 4,149,687 issued on Apr. 17, 1979 to Rosemary A. Nunemacher. However, both the Hathaway child carrier and the Nunemacher baby pouch are intended to be worn on the body of a person, in contrast to the manner of support of the present invention.

A related device, utilizing a backpack-like design is disclosed in U.S. Pat. No. 4,333,591 issued on Jun. 8, 1982 to Dorothy S. Case. This device, however, as well as devices of the type exemplified by the aforementioned Hathaway and Nunemacher patents, do not provide protection against injury for the baby, infant, or small child who occupies the device.

A box-like child carrier is disclosed in U.S. Pat. No. 4,923,104 issued on May 8, 1990 to Doris Rice et al. A device of this type, however, is likewise not suited for use in the hazardous environment of an aircraft.

Other devices ar also known to the art for the protection of passengers or crewmembers during aircraft travel. Typical of these is a protection system for a crewmember of an aircraft, as disclosed in U.S. Pat. No. 4,834,322 issued on May 30, 1989 to Stephen G. Wurst. According to this invention, the crewmember is seated in a device that provides support for the upper torso, restraining the crewmember while in a leaning or crouched position. However, devices of this type are not intended for the protection of a baby or small child.

None of these devices establishes a protective environment suited to the needs of transportation and protection of a baby, infant or small child within the environment of an aircraft. All of these devices are distinguished from the present invention in that they do not provide protection from the hazards of aircraft travel, including rapid deceleration, sudden motions, and airborne objects or fragments of objects within the vehicle interior.

SUMMARY AND OBJECTS OF THE INVENTION

Accordingly, it is an object of the present invention to provide a high level of safety in the transportation of a baby, infant, or small child on a commercial aircraft.

Another object of the invention is to provide such transportation with a high degree of comfort, over an extended period of time.

Yet another object of the invention is to provide for secure fastening of the baby or infant within the device.

Still another object of the invention is to provide for a rearwards-facing orientation of the baby or infant in the device, to reduce the undesirable effects of sudden deceleration.

A further object of the invention is to provide for cushioning to protect the baby or infant from sudden deceleration or unusual motions of the aircraft.

Another further object of the invention is to provide immobility in the mounting of the device, and to secure it to a structural member of the vehicle.

Another object of the invention is to provide protection from airborne objects, or fragments of objects, such as could be present during a crash.

At the same time, it is yet another object of the invention to provide this protection while allowing oral and visual communication between the baby or infant and the accompanying parent or adult.

Yet another object of the invention is to allow feeding of the baby or infant during carriage within the device.

These and other objects of the present invention are realized by a device constructed according to the present invention as a pouch, sack or bag, fabricated of fabric, soft plastic or leather, in conjunction with other soft cushioning material, and installed on the front bulkhead of any passenger compartment of an aircraft, or any solid and rigid surface, including the walls, ceiling or floor of the aircraft. A shoulder strap harness is provided to restrain the baby or infant in the event of violent aircraft motion during turbulence, or in the event of inversion of the aircraft during a crash or similar accident. The fabric carrier is provided with a clear or translucent protective cover, which is placed over the carrier device. The cover is fabricated with a number of holes or apertures, to allow free circulation of air. The cover is constructed of a clear plastic material that is resistant to impact. The complete assembly is attached to an aircraft bulkhead.

The baby, infant, or small child is placed into the carrier, and the protective cover is placed into position. The occupant of the carrier is thus secured for takeoff and landing, and in the event of violent aircraft motion during the flight. While the child is in the carrier, oral and visual communication between the baby or small child and the accompanying parent can be freely conducted.

The transparent plastic cover is equipped with baffles or shields attached in front of, or alternatively in back of, the ventilation holes. This allows free circulation of air, but also prevents small airborne objects from entering the carrier unit by blocking any straight line entry paths.

Each bulkhead on a aircraft is of sufficient size to accommodate a number of individual baby carriers. Thus, a multiple number of such carriers can be operated on a single aircraft during a flight.

It can thus be seen that this baby carrier features a novel method of installation, specifically by hanging on an existing aircraft bulkhead structure, or alternatively on any solid and rigid surface, including the walls, ceiling or floor of the aircraft. It also provides, in an aircraft baby or child carrier, the novelty of restraint strapping and cushioning, in conjunction with a transparent, impact resistant protective cover, that permits free air circulation.

BRIEF DESCRIPTION OF THE DRAWINGS

Reference should be taken to the following detailed description, in connection with the accompanying drawings, wherein like members bear like reference numeral and wherein.

DESCRIPTION OF THE PREFERRED EMBODIMENTS

Figure 1:
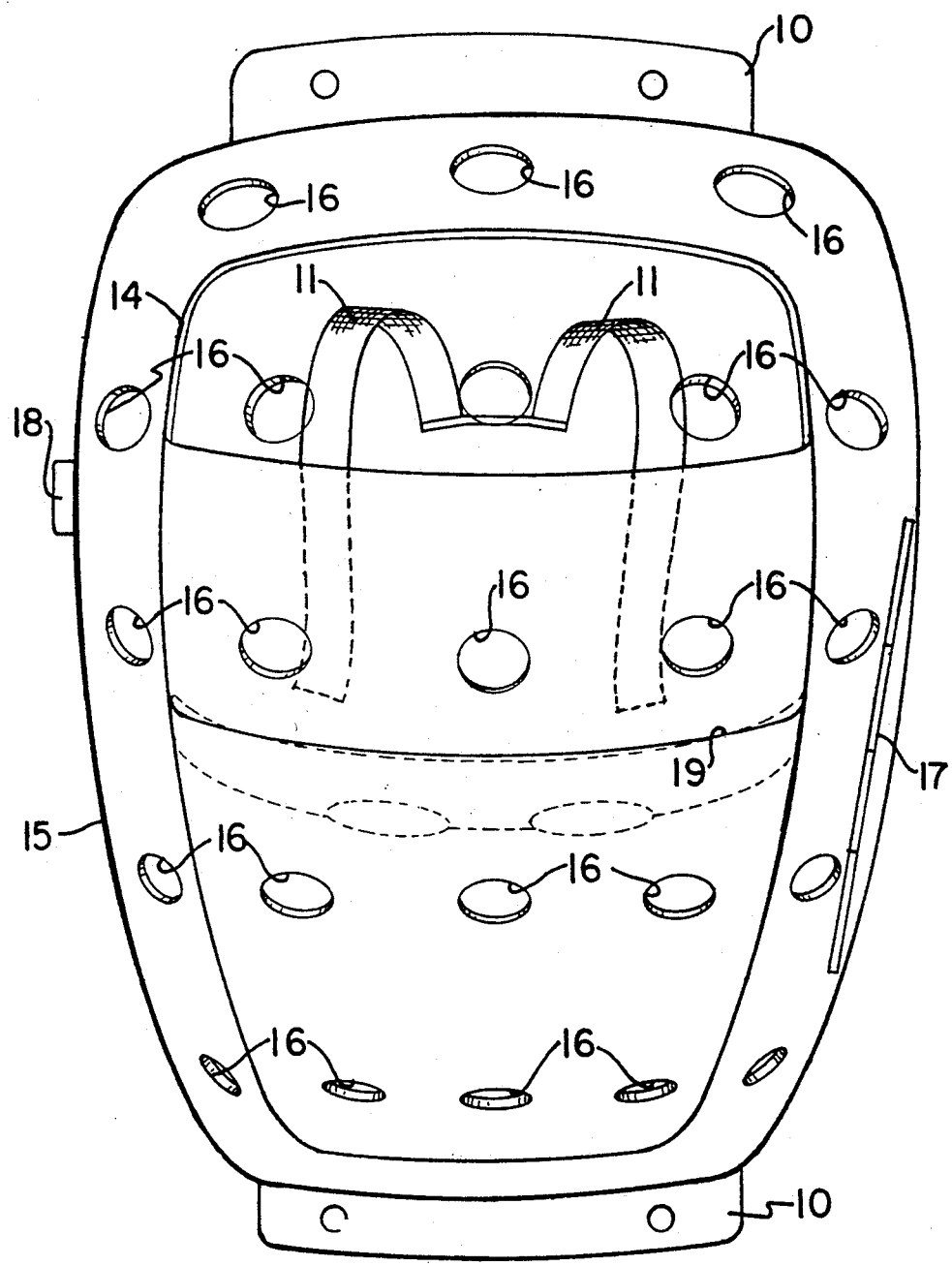
FIG. 1 is a frontal view of the preferred embodiment of the baby or child carrier according to the present invention.
Figure 2:
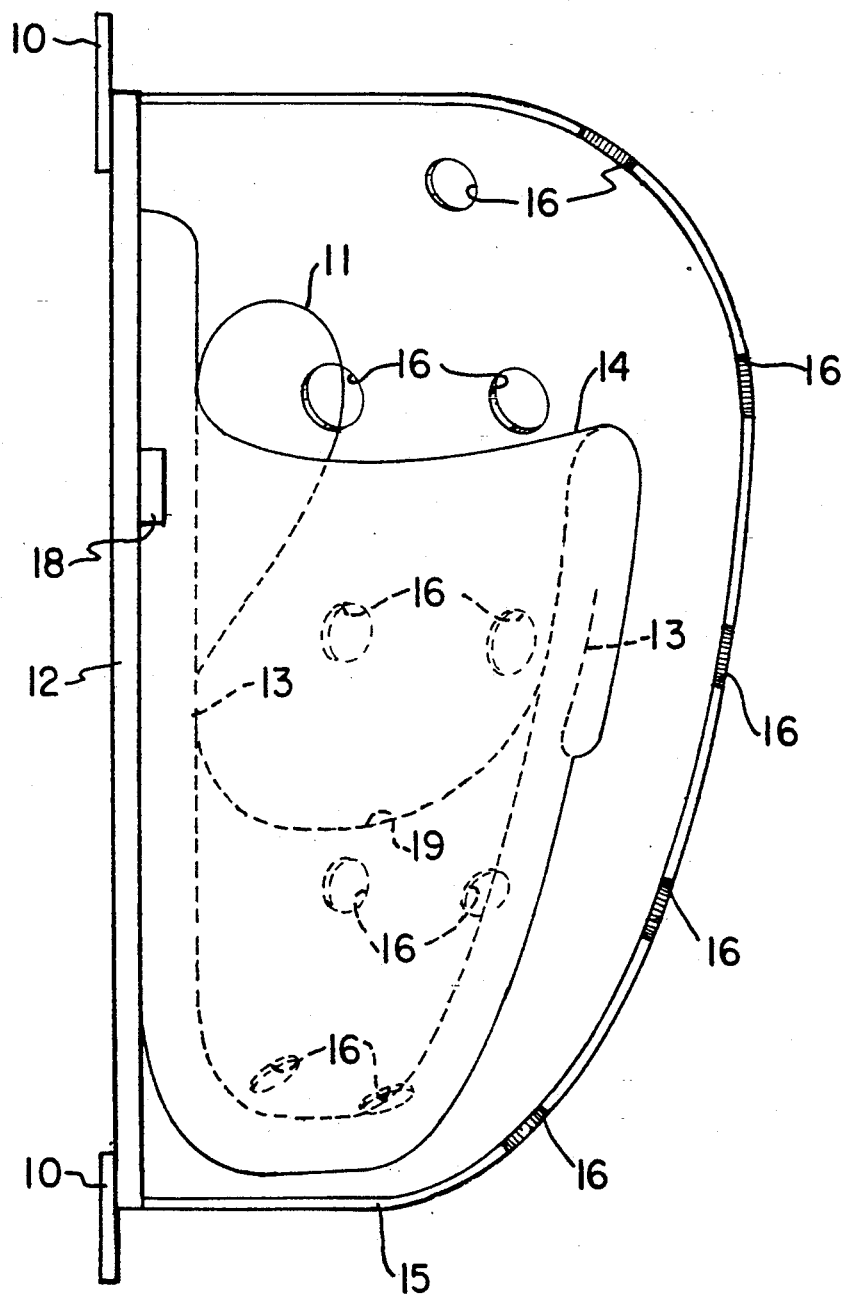
FIG. 2 is a side view of the baby or child carrier.

With reference to FIG. 1 and FIG. 2, the baby or child carrier according to the present invention includes a mounting board 12 that is attached to an aircraft bulkhead by means of bracket 10, to position the assembly in a rearwards facing direction. A fabric pouch 14 is fastened to mounting board 12. The pouch is made of fabric, flexible plastic sheeting or other flexible soft material. It is filled with padding, foam rubber or gel 13. The pouch 14 is fitted with an internal seat 19 to receive the baby, infant or small child. The seat 19 is made from a sheet of fabric, plastic or other flexible material, and is fastened to the pouch 14 at the front and the back. The seat 19 is fabricated with leg holes, to allow the legs of the infant or small child to protrude downwards into the lower area of the pouch 14.

Shoulder straps 11 are provided to restrain the baby or small child in the event of the action of sudden forces.

A clear plastic cover 15 mounts over the pouch 14. The clear cover 15 is fabricated from a strong, rugged and resilient plastic material, such as General Electric Lexan brand polycarbonate resin, or a material with similar properties.

The clear plastic cover 15 is fastened to the mounting board 12 by means of hinge 17 on one side, and is secured by latch 18 on the opposite side. The use of the hinge 17 allows the cover to be opened to insert or remove the baby or small child.

The clear plastic cover 15 is provided with a number of holes 16 to allow free air circulation into the baby or child carrier.

Figure 4:
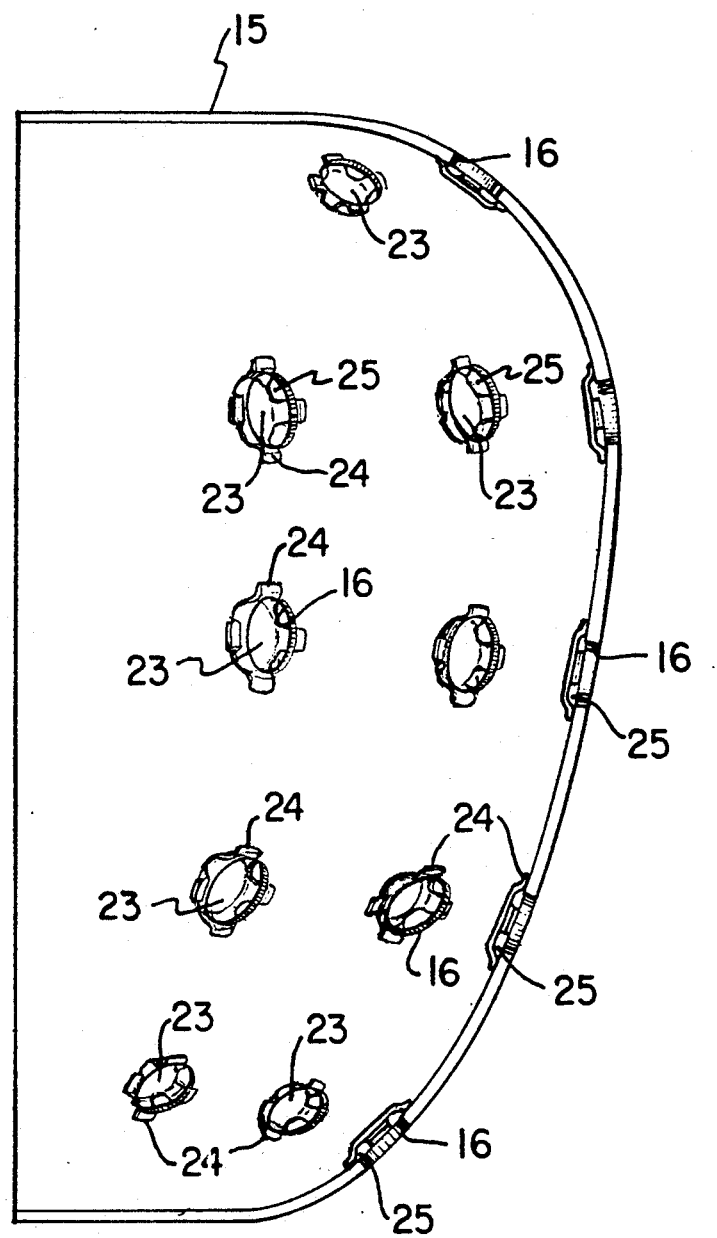
FIG. 4 is a side view of the clear protective cover of the preferred embodiment of the baby or child carrier.

Referring now to FIG. 4, the clear plastic cover 15 is fitted with a number of baffles 23 over the air holes 16. The baffles 23 allow free circulation of air, but prevent the free passage of small objects, or fragments of objects, that may be present at a high velocity as a result of a crash or other mishap. The baffles 23 are constructed from similar material to that of the cover 15. The baffles 23 are provided with a number of feet 24, by which they are fastened to the cover 15, over the air holes 16. The body of each baffle 23 is raised to allow free air circulation through cutouts 25.

Figure 3:
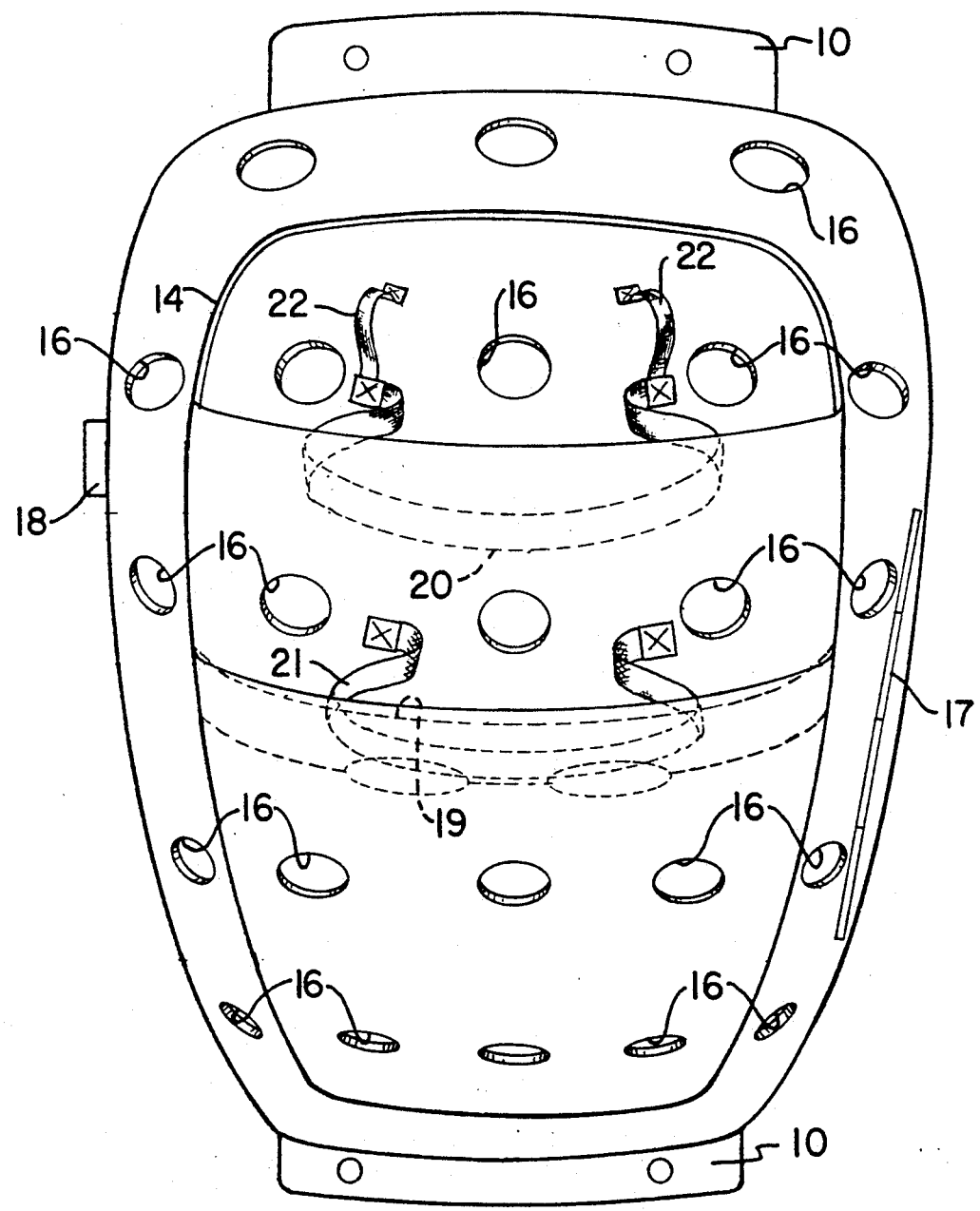
FIG. 3 is a frontal view of the baby or child carrier showing certain alternate methods of construction.

An alternative method of construction is shown in FIG. 3. The baby or small child is restrained within the pouch 14 by means of a strap 20 across the chest, a strap 21 across the hips or pelvic area, and a pair of straps 22 that restrain the upper arms. These straps 20, 21 and 22 can be utilized individually or in combination.

Figure 5:
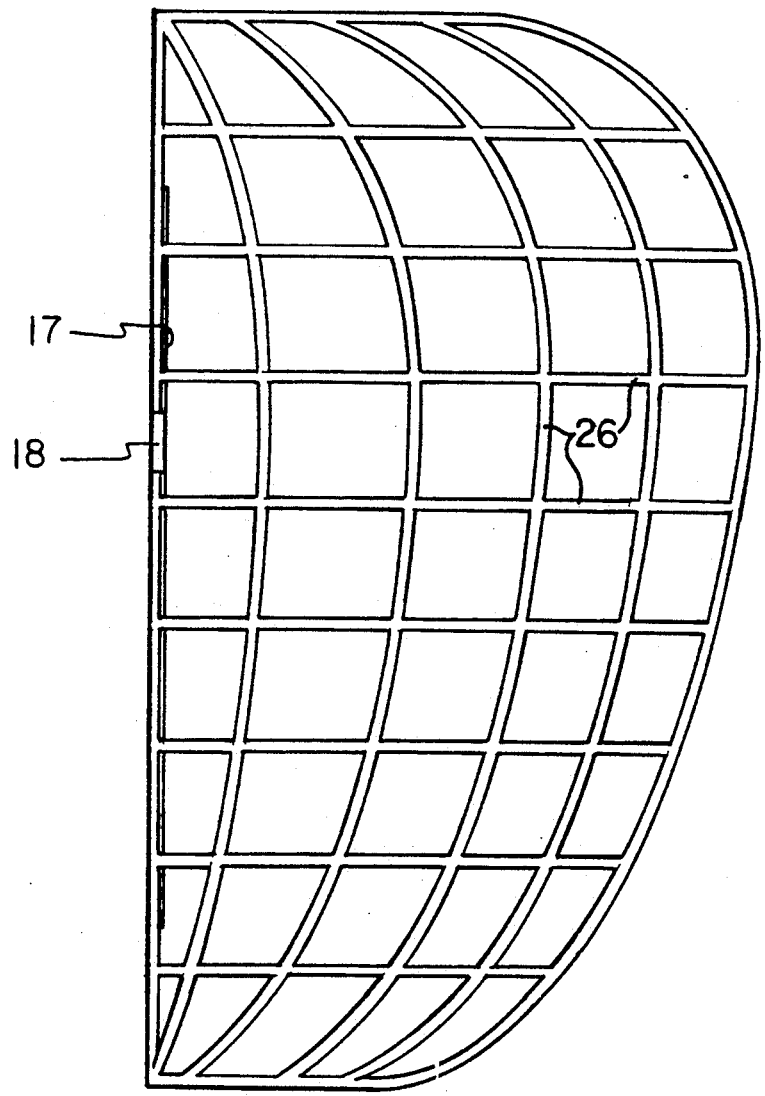
FIG. 5 a side view of an alternate type of protective cover for the baby or child carrier.

An alternative method of construction of the outer cover is shown in FIG. 5. According to this alternative, the outer cover 26 is constructed as a metal grid, instead of the clear plastic cover 15 described previously. The cover 26 is fabricated from heavy gauge wire, and is spot-welded at the points of intersection. The wire comprising the cover 26 can be of stainless steel, or any other suitable metal.

A number of further alternative methods of construction can be employed without departing from the spirit and scope of the invention. For example, the pouch can be fabricated of any soft fabric-like material. Various alternative cushioning materials can be used to provide protection against impact.

The protective cover can be fabricated out of any transparent or translucent high strength plastic, or similar material, such as General Electric Lexan brand polycarbonate resin. The carrier can be installed onto any aircraft structure that provides the necessary degree of stability and allows the carrier to face rearwards.

The foregoing specification describes a particular embodiment of the invention. It is understood that various departures in construction can be taken by those skilled in the art without departing from the spirit and scope of the present invention.

We claim:

1. A carrier unit for a baby, infant, or small child, said carrier unit mountable on a wall, bulkhead or other structural surface of an aircraft or other vehicle, comprising:

a rigid mounting board for mounting the carrier unit to the aforementioned wall, bulkhead or other structural surface; and a pouch, sack or bag constructed of cushioning material and fastened to the aforementioned mounting board; and mounting means comprising rigid brackets including aperture means for receiving screws, bolts, and the like for fastening said carrier unit onto a wall, bulkhead or other structural surface of an aircraft or other vehicle, in an orientation such that the occupant is facing rearwards with respect to the direction of travel of such aircraft or other vehicle;

wherein a baby, infant, or small child can be accommodated within the aforementioned vehicle during transit.

2. A device as described in claim 1 and further comprising straps that secure the baby, infant or small child to the aforementioned mounting board by means of said straps, wherein the straps are constructed of fabric, leather, plastic or similar flexible material, and are positioned to retainably engage the shoulders of the aforementioned baby, infant or small child.

3. A device as described in claim 1 and further comprising straps that secure the baby, infant or small child to the aforementioned mounting board by means of said straps, wherein the straps are constructed of fabric, leather, plastic or similar flexible material, and are positioned to retainably engage across the chest of the aforementioned baby, infant or small child.

4. A device as described in claim 1 and further comprising straps that secure the baby, infant or small child to the aforementioned mounting board by means of said straps, wherein the straps are constructed of fabric, leather, plastic or similar flexible material, and are positioned to retainably engage the hips of the aforementioned baby, infant or small child.

5. A device as described in claim 1 and further comprising straps that secure the baby, infant or small child to the aforementioned mounting board by means of said straps, wherein the straps are constructed of fabric, leather, plastic or similar flexible material, and are positioned to retainably engage the extremities of the aforementioned baby, infant or small child.

6. A device as described in claim 1 and further comprising a seat-like or harness-like body-supporting means contained within the aforementioned pouch, sack or bag, wherein the aforementioned body-supporting means is constructed of fabric, leather, plastic or similar flexible material.

7. A device as described in claim 1 and further comprising a protective cover constructed of rigid transparent or translucent material or a similar material; said protective cover containing a number of holes that allow free circulation of air; and baffles or shields attached in front of, or alternatively in back of, the aforementioned holes in the protective cover; and said protective cover disposed to completely cover the occupant of the device.

8. A device as described in claim 7, wherein the protective cover of claim 7 is fastened to the aforementioned mounting board by means of one or more hinges or other flexible fastening means, and further comprising latching means that retain said protective cover in a closed position.

9. A device as described in claim 1 and further comprising a protective cover fabricated as a metal grid-like structure.

10. A device as described in claim 9, wherein the protective cover of claim 11 is fastened to the aforementioned mounting board by means of one or more hinges or other flexible fastening means, and further comprising latching means that retain said protective cover in a closed position.

* * * * *